United States Patent [19]

Millward et al.

[11] 4,088,399
[45] May 9, 1978

[54] AUDIO VISUAL APPARATUS

[75] Inventors: John David Millward, Hitchin; Brian Wilsher, Royston; Ronald Mumford, Hitchin, all of England

[73] Assignee: The Rank Organisation Limited, London, England

[21] Appl. No.: 686,549

[22] Filed: May 13, 1976

[30] Foreign Application Priority Data

May 13, 1975 United Kingdom ............... 20137/75
Aug. 21, 1975 United Kingdom ............... 34760/75

[51] Int. Cl.² ............................................. G03B 31/02
[52] U.S. Cl. ......................................... 352/27; 352/29; 352/80
[58] Field of Search ..................... 352/80, 27, 29, 30, 352/136; 360/3

[56] References Cited

U.S. PATENT DOCUMENTS

| 1,811,365 | 6/1931 | Owens | 352/30 |
| 1,839,037 | 12/1931 | Kellogg | 352/29 |
| 1,854,004 | 4/1932 | Tchopp | 352/80 |
| 2,061,879 | 11/1936 | Paillard | 352/80 |
| 2,912,516 | 11/1959 | Hallmann | 352/80 |
| 3,404,937 | 10/1968 | Peirez | 352/30 |

FOREIGN PATENT DOCUMENTS 1,014,839  8/1957  Germany ............................. 352/80

*Primary Examiner*—Monroe H. Hayes
*Attorney, Agent, or Firm*—Brisebois & Kruger

[57] ABSTRACT

In a dual film-gauge telecine apparatus two optical sound heads are provided in close proximity to the drive capstan. The drive capstan is provided with an annular groove to support one of the optical sound heads. The sound heads comprise a light source and light sensitive detector so disposed as to be in alignment on opposite sides of the edge of a film of the respective gauge.

5 Claims, 4 Drawing Figures

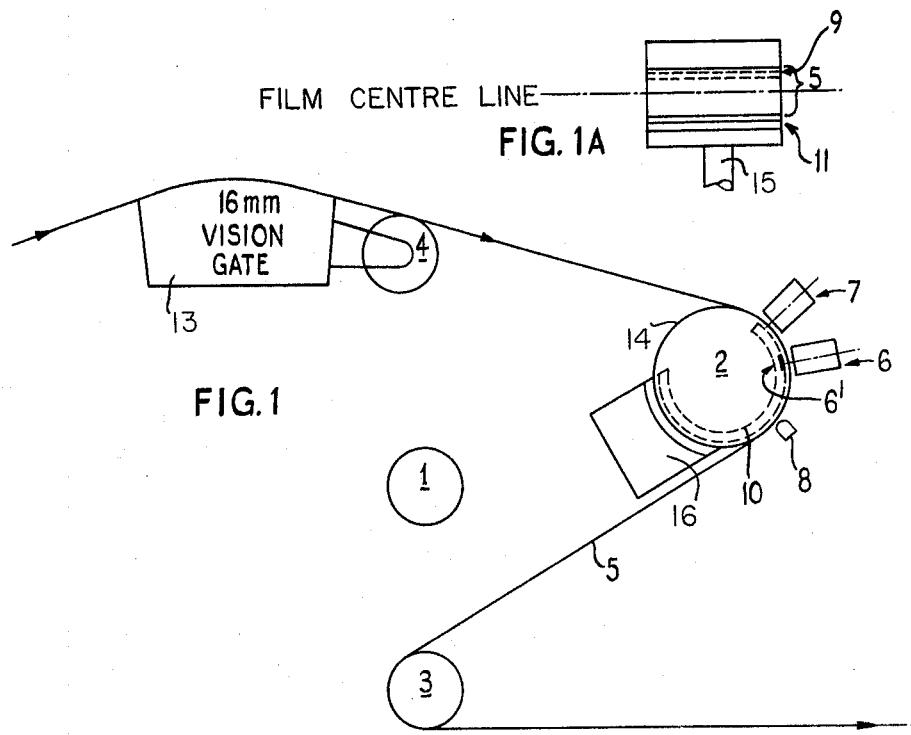
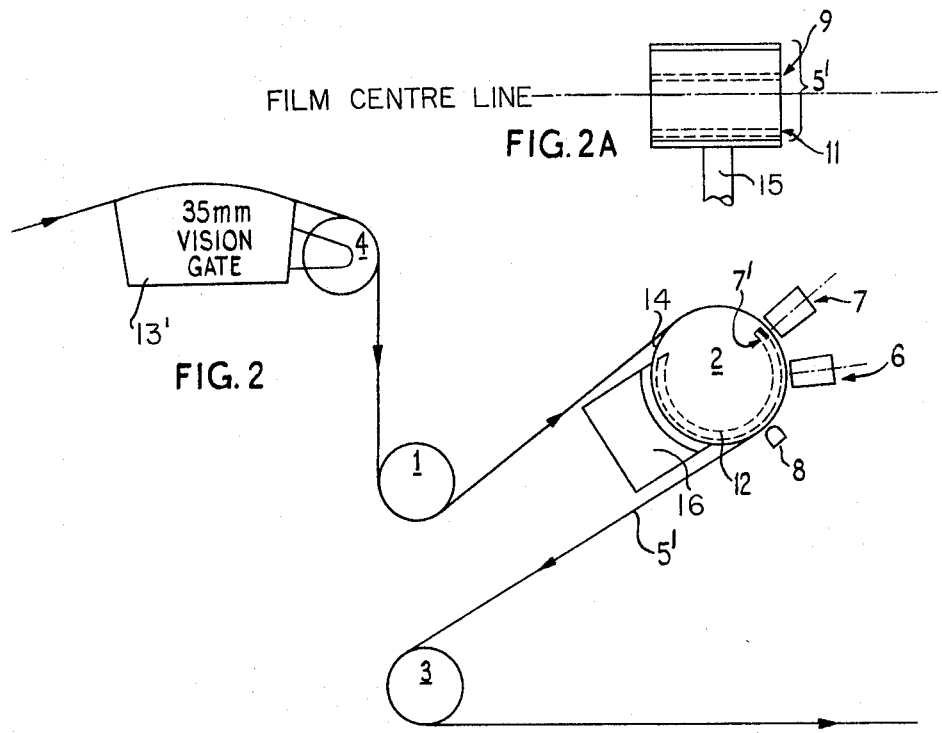

AUDIO VISUAL APPARATUS

This invention relates to a telecine capable of handling either one of two standard film sizes, for example both 16mm and 35mm film. Although telecines adapted to handle a single gauge of film are known in the prior art, the prior art has not, so far as we are aware, provided any commercially available dual standard professional telecine. One reason is the difficulty arising from the fact that different gauges of film, such as the well-known 16 mm and 35 mm gauges, have their optical sound tracks differently spaced both longitudinally and across the width of the film. Of course, it is theoretically possible to design a dual standard telecine which is essentially a combination of two single standard machines and has a separate drive capstan or flywheel for the sound heads of each gauge. However, this leads to a complicated and expensive construction. It would be desirable, therefore, to provide a construction of dual standard telecine which allows the use of only one film drive capstan and no other sound head flywheel. The desire to use only a single capstan raises considerable problems, however, which are discussed later. The present invention is directed to solving these problems.

It is, therefore, an object of the invention to provide a dual standard telecine apparatus, reproducing in both sound and vision, in an uncomplicated manner.

It is a further object of the invention to provide a dual standard telecine apparatus having only a single film drive capstan and no other sound head flywheels.

Accordingly, the invention provides in a telecine apparatus a common rotatable drive capstan for films of either one of two film gauges, the capstan having a cylindrical film-driving surface concentric with the axis of rotation of the capstan; a common scanning position for films of either gauge; means providing a different film path for each film gauge whereby the distance along each film path from the scanning position to the capstan is equal to the picture/optical sound spacing of the respective film gauge, each film path being such that in use the capstan is engaged by the film only partially around its cylindrical film-driving surface and the centre-line of the film at the scanning position and at the capstan is the same for each gauge; first and second optical sound heads for the narrower and wider film gauges respectively, each optical sound head being arranged in close proximity to the drive capstan and comprising two parts including a light source and a light sensitive detector respectively, the two parts being disposed so as to be in alignment on opposite sides of the edge of a film of the respective gauge when the film is driven by the capstan; at least one annular groove in the cylindrical film-driving surface of the capstan, the groove lying in a plane perpendicular to the rotational axis of the capstan; a fixed support member disposed adjacent a region of the capstan which in use is not engaged by a film of either gauge; and a fixed curved arm supported by the support member and extending within the groove to a region of the capstan which in use is engaged at least by a film of the narrower gauge, the first optical sound head having one part supported in the groove by the curved arm.

The object of the invention is to provide such a machine, reproducing in both vision and sound, in an uncomplicated manner.

According to the invention, therefore, we provide a dual gauge telecine using only a single film drive capstan and no other sound head flywheels.

An embodiment of the invention will now be described with reference to the accompanying drawings, in which:

FIG. 1 shows the layout of the relevant parts of the telecine laced with 16mm film, FIG. 1A shows the capstan of FIG. 1 from the side and indicates the position of the 16mm film relative to the sound head grooves, FIG. 2 shows the layout of the relevant parts of the telecine of FIG. 1 laced with 35 mm film, and FIG. 2A again shows the capstan from the side and indicates the position of the 35 mm film relative to the sound head grooves.

In the drawings, only those parts essential for an understanding of the invention have been shown, these parts all being in the projector portion of the telecine.

The scanning portion of the telecine may be entirely conventional, although it is to be understood that the scanning raster size will be altered according to the gauge of film being handled. This may be accomplished in known manner by changing the operating voltages of the scanner.

To make the projector as simple as possible only one capstan or flywheel is used and the optical axis of the vision gate is the same for the two gauges. This means that the centre-line of the film at the vision gate should be the same for each gauge, and also at the capstan to avoid twisting of the film.

Three sound heads are required for the two gauges 16mm and 35mm, these being 35mm optical, 16mm optical and 16mm magnetic, and these sound heads must be placed in close proximity to the capstan where the film motion is uniform.

With these limitations two problems arise. Firstly the spacing between optical sound and picture is significantly different between 16mm and 35mm film. This is overcome by using a different lacing path for each gauge to allow for the increased picture-sound spacing with 35mm film.

The second problem is that as the capstan has to be wide enough to support 35mm film it obstructs the light path for the 16mm optical sound head. Optical sound heads consist of two parts, the first part being made up of a light source, slit and objective lens and the second part, a photocell, which lies on the opposite side of the film. Normally, the film overhangs the capstan or flywheel so that access to both sides of the film is obtained. In this case the 16mm film cannot overhang the capstan since the film centre is the same for each gauge. Thus the photocell is mounted inside the capstan by cutting a slot or groove in the capstan. The supporting member or arm for the photocell fits inside this slot and is circular in shape so that a film wrap of at least 180° can be obtained.

In the embodiment to be described, the drawings show both 35mm and 16mm photocells in the capstan slots. Although it is not necessary for the 35mm photocell (since the edge of the 35 mm film may be allowed to hang over the end of the capstan) we have extended the technique to the 35mm sound head to give extra support to the edge of the 35mm film.

The drawings show the different lacing paths for 16mm and 35mm film. In FIG. 1 the 16mm film 5 passes from the vision gate 13 directly to the drive capstan 2, the distance along the film path between the vision gate 13 and capstan 2 being, of course, equal to the picture/optical sound spacing of the 16 mm film. In FIG. 2, however, the 35 mm film 5' from the 35 mm vision gate 13' is deflected around rollers 4 and 1 before reaching the capstan 2. This increases the distances of travel of the 35mm film from the vision gate to the capstan, where the various sound heads are located, to allow for the increased picture-sound spacing of the 35mm film. After leaving the capstan the film in each case passes around a roller 3.

Three sound heads are located at the capstan 2, these being the 16mm optical sound head 6,6'; the 35mm optical sound head 7,7'; and the 16mm magnetic sound head 8. As mentioned before, each optical sound head consists of two parts, and in the present case the first part 6 of the 16mm optical sound head is disposed outside the film 5 opposite its second part, the photocell 6'. The photocell 6' is disposed in a slot 9 in the capstan 2 and is carried by a curved member or arm 10 which fits in this slot and is connected to support 16. The position of the film 5 relative to the slot 9 is shown in FIG. 1A.

Similarly, the 35mm optical sound head consists of the first and second parts 7 and 7' respectively with the first part 7 disposed outside the film 5' opposite its photocell 7'. The latter is disposed in a further slot 11 in capstan 2 and is carried by a further curved member 12 which fits in the slot.

It will also be noted, as shown in the drawing, that the capstan 2 is engaged by the films only partially around its cylindrical film-driving surface 14, leaving a region of the capstan (at lower left in the drawing) not engaged by films of either gauge and where support 16 for the curved arms 10 and 12 is located.

The drive capstan itself, apart from the grooves 9 and 11 may be of conventional construction. As shown it consists of a single cylindrical body rigidly mounted on a drive shaft 15, the cylindrical outer surface of the body constituting the film-driving surface 14 of the capstan and being coaxial with the axis of rotation of the shaft 15. In order to remove any eccentricity errors the final surface 14 is formed, as is conventional in modern professional machines, by precision grinding after the capstan has been finally mounted on its drive shaft 15.

The groove 9 is formed in the cylindrical film-driving surface 14 of the capstan 2, the groove lying in a plane perpendicular to the rotational axis of the capstan. The curved arm 10 is supported by the fixed support member 16 disposed adjacent the aforementioned region of the capstan 2 which in use is not engaged by the films. The arm 10 extends within the groove 9 from the member 16 to a region of the capstan 2 engaged by the 16mm film 5, and there carries the photocell 6'. Since the arm 10 is similarly curved to the groove 9 and is recessed slightly below the surface 14 as shown, it does not interfere with the rotation of the capstan 2 or the passage of the film 5.

Similarly, the arm 12 is supported by the fixed support member 16 and extends within the groove 11 to a region of the capstan 2 engaged by the 35 mm film, and there carries the photocell 7'. The groove 11 lies in a plane parallel to that containing the first groove 9.

What we claim is:
1. In a telecine apparatus:
    a common rotatable drive capstan for films of either one of two film gauges, the capstan having a cylindrical film-driving surface concentric with the axis of rotation of the capstan;
    a common scanning position for films of either gauge;
    means providing a different film path for each film gauge whereby the distance along each film path from the scanning position to the capstan is equal to the picture/optical sound spacing of the respective film gauge, each film path being such that in use the capstan is engaged by the film only partially around its cylindrical film-driving surface and the centre-line of the film at the scanning position and at the capstan is the same for each gauge;
    first and second optical sound heads for the narrower and wider film gauges respectively, each optical sound head being arranged in close proximity to the drive capstan and comprising two parts including a light source and a light-sensitive detector respectively, the two parts being disposed so as to be in alignment on opposite sides of the edge of a film of the respective gauge when the film is driven by the capstan;
    at least one annular groove in the cylindrical film-driving surface of the capstan, the groove lying in a plane perpendicular to the rotational axis of the capstan;
    a fixed support member disposed adjacent a region of the capstan which in use is not engaged by a film of either gauge; and
    a fixed curved arm supported by the support member and extending within the groove to a region of the capstan which in use is engaged by at least by a film of the narrower gauge, the first optical sound head having one part supported in the groove by the curved arm.

2. A telecine apparatus according to claim 1, in which the said one part of the first optical sound head includes the light sensitive detector.

3. A telecine apparatus according to claim 1, comprising a further annular groove in the film-driving surface of the capstan, the further groove lying in a plane parallel to the first plane, and a second fixed curved arm supported so as to extend within the further groove to a region of the capstan which in use in engaged by a film of the wider gauge, the second optical sound head having one part supported in the further groove by the second curved arm.

4. A telecine apparatus according to claim 1, further comprising a pair of vision gates, one for each film gauge, which are interchangeable at the film scanning position.

5. A telecine apparatus according to claim 1, further comprising a magnetic sound head for the narrower gauge film in close proximity to the capstan.

* * * * *